United States Patent [19]

Eckman

[11] Patent Number: 4,688,970
[45] Date of Patent: Aug. 25, 1987

[54] POWER DRILL AND AUTOMATIC CONTROL SYSTEM THEREFORE

[75] Inventor: Richard E. Eckman, Houston, Tex.

[73] Assignee: Dresser Industries, Inc., Dallas, Tex.

[21] Appl. No.: 763,936

[22] Filed: Aug. 9, 1985

[51] Int. Cl.$^4$ ............................................. B23B 41/00
[52] U.S. Cl. .......................................... 408/9; 408/10; 408/12; 408/137; 408/702
[58] Field of Search ........................ 408/3, 8, 9, 10, 11, 408/12, 13, 137, 702

[56] References Cited

U.S. PATENT DOCUMENTS

| | | | |
|---|---|---|---|
| 2,901,927 | 9/1959 | Morgan | 408/3 |
| 3,259,023 | 7/1966 | Rieger et al. | 408/9 |
| 3,458,881 | 8/1969 | Drechsler et al. | 408/3 |
| 4,157,231 | 6/1979 | Phillips | 408/9 |
| 4,198,180 | 4/1980 | Schultz | 408/9 |
| 4,346,444 | 8/1982 | Schneider et al. | 408/11 |
| 4,540,318 | 9/1985 | Hornung et al. | 408/9 |

*Primary Examiner*—Gil Weidenfeld
*Assistant Examiner*—Daniel W. Howell

[57] ABSTRACT

A power drill and automatic control system includes a drill spindle for mounting a rotary cutter, a spindle rotation drive including a drive motor and an associated rotation drive mechanism operably connected to the spindle to rotate it; a spindle feed drive includes a feed motor and an associated feed drive mechanism operably connected to the spindle to feed it in a forward direction toward a workpiece and in a reverse direction retracting it away from the workpiece. Control is provided to start and stop the spindle rotation drive motor and the spindle feed motor independently. Control is provided for the spindle rotation drive to vary the rotational speed. Control is provided with the spindle feed drive to vary the rate of feed of the spindle. A sensor with the spindle rotation drive senses operational torque of the spindle. Another sensor with the spindle feed drive senses thrust force on the spindle and the associated cutter. A rotation sensor with the spindle rotation drive senses and monitors the spindle rotation. Another rotation sensor with the spindle feed drive senses and monitors the spindle feed drive rotation. A control circuit is operably connected to control rotational speed of the spindle, the rate of feed motion of the spindle toward and retracting from a workpiece, to control the displacement of the spindle to a predetermined depth and to control removal of the cutter from the workpiece on completion of the drilling operation.

17 Claims, 4 Drawing Figures

POWER DRILL AND AUTOMATIC CONTROL SYSTEM THEREFORE

TECHNICAL FIELD

This invention is related to portable automatic drilling devices adapted to be attached to a workpiece for the purpose of drilling into the workpiece. More specifically, this invention is related to improved drills for drilling into a workpiece of composite material that requires different cutter speeds and feed rates depending upon the particular layer of material being penetrated. Also, this invention is related to drilling equipment that can be programmed or directed to drill in a predetermined sequence of steps and operations and upon completion of the drilling operation remove the cutter from the workpiece.

BACKGROUND OF THE INVENTION

In the construction of airplanes and certain vehicles the use of composite materials having separate and distinct layers of different materials poses certain problems to drilling these materials for assembly of the finished product. In drilling laminated layers of composite materials the layers of non-metallic material must be drilled at a higher cutter rotation speed with lower cutter feed advance than do the metallic layers of these materials.

Typical prior art positive feed drills are constructed to have a fixed cutter rotation speed and cutter feed rate for a particular setup to drill a particular hole or series of holes. These prior art devices typically would require dismantling, replacement of speed adjusting gears and reassembly of the particular tools in order to change the cutter rotation speed or feed rate. Therefore, using this type of positive feed drills for proper drilling of laminated workpieces would require either changing the drills upon penetration of the particular layers involved for them to be drilled at an optimum or appropriate cutter rotation speed and feed rate. In a mass production environment the changing of the drills several times to produce one hole is an unacceptable solution. Also, movement of drills from one workpiece to another may provide an alternate solution in some circumstances. However, for holes that must be drilled within precise tolerances the inaccuracies involved in moving the drills from one workpiece to another can present serious alignment difficulties as well as being extremely time consuming and burdensome in a manufacturing operation.

The power drill and control of this invention is constructed to solve the drilling problems presented above and provide a drill that can operate in various cutter speed and feed combinations with respect to the material through which it is drilling. The drill is equipped to sense the depth of the cutter in the material through which it is cutting as well as changing load conditions that effect the drilling operation.

SUMMARY OF THE INVENTION

In a preferred embodiment the power drill and control of this invention includes a drill spindle for mounting a rotary cutter. The spindle is driven by spindle rotation drive motor and an associated rotation drive mechanism operably connected to the spindle. A spindle feed drive includes a feed motor and an associated feed drive mechanism operably connected to the spindle to feed it in a forward direction toward the workpiece and in a retract direction away from the workpiece. Control is provided for these drives to stop and start the drive motor and the feed motor independently. A separate control of the spindle rotation drive will vary rotational speed of the spindle. The spindle feed drive is constructed to vary the rate of feed of the spindle. The spindle rotation drive is constructed to sense operational torque on the spindle. A separate sensor with the spindle feed drive senses thrust force on the spindle and its associated cutter. The spindle rotation drive is constructed to sense and monitor the spindle drive rotation. A similar sensor with the spindle feed drive is constructed to sense and monitor the feed drive rotation. The control of the power drill is operable to control rotational speed of the spindle and to control feed rate motion of the spindle toward a workpiece as well as to control the spindle displacement to a predetermined depth and also to control removal of the cutter from the workpiece when the desired depth is reached.

One object of this invention is to provide a power drill and control therefore overcoming the aforementioned disadvantages of the prior art devices in drilling laminated workpieces.

Still, one other object of this invention is to provide a substantially automatic positive feed drill adapted for drilling composite layers of laminate material that require different cutter rotation speeds and feed rates for optimum drilling.

Still, another object of this invention is to provide a portable positive feed drill for temporary attachment to a workpiece that can have the cutter rotational speed and feed rate independently adjustable over a wide range to accommodate drilling through layers of a laminated material requiring different cutter speeds and feed rates.

Various other objects, advantages, and features of this invention will become apparent to those skilled in the art from the following discussion, taken in conjunction with the accompanying drawings, in which:

The following is a discussion and description of preferred specific embodiments of the power drill and control of this invention, such being made with reference to the drawings, whereupon the same referenced numerals are used to indicate the same or similar parts and/or structure. It is to be understood that such discussion and description is not to unduly limit the scope of this invention.

DETAILED DESCRIPTION

Figures 1, 2:
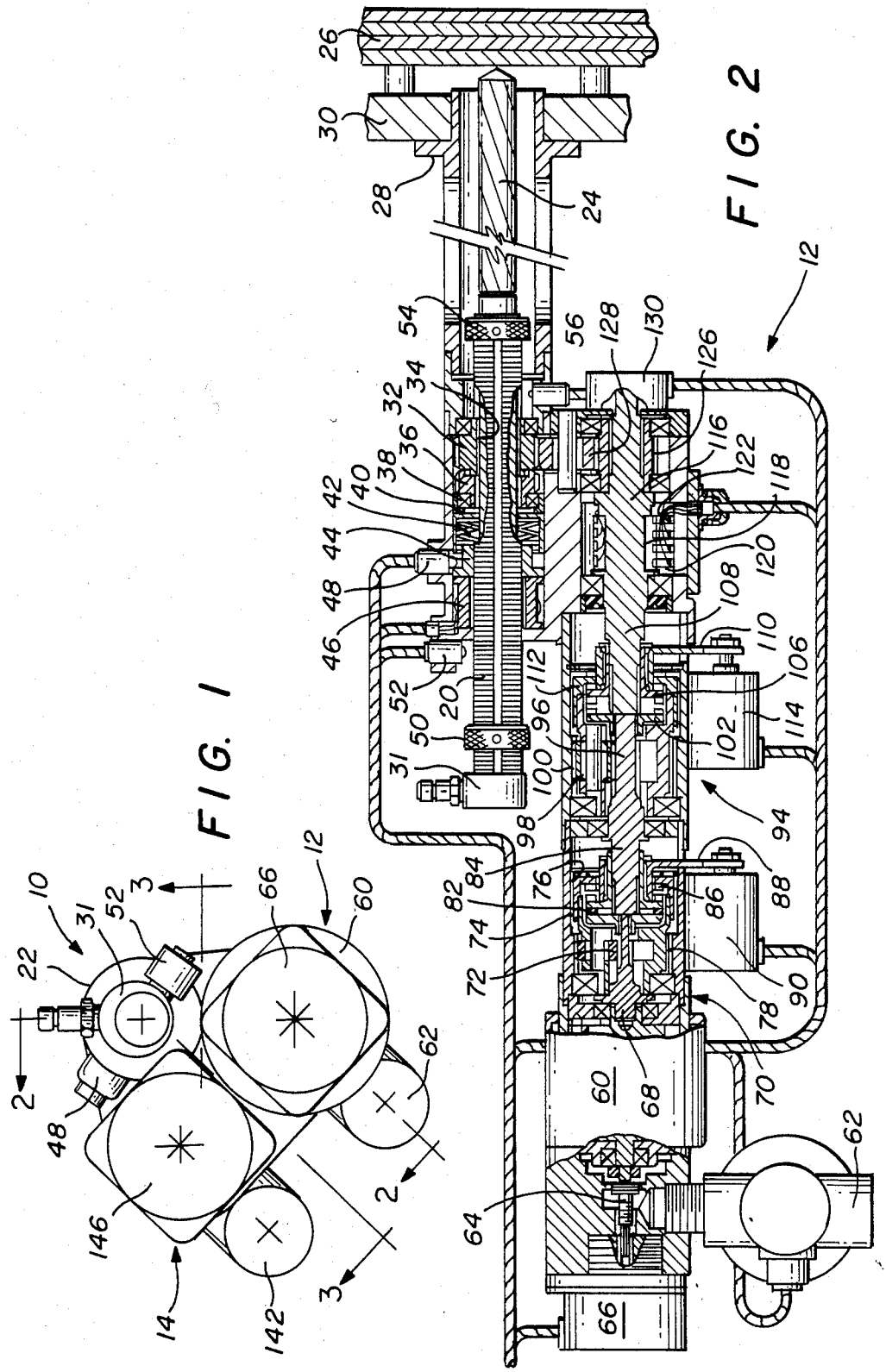
FIG. 1 is a top end view of the power drill of this invention.
FIG. 2 is a partially sectioned pictorial elevation view of the spindle rotation drive of the power drill taken approximately along line 2—2 of FIG. 1 with portions of the drill shown in full view for clarity.
Figure 3:
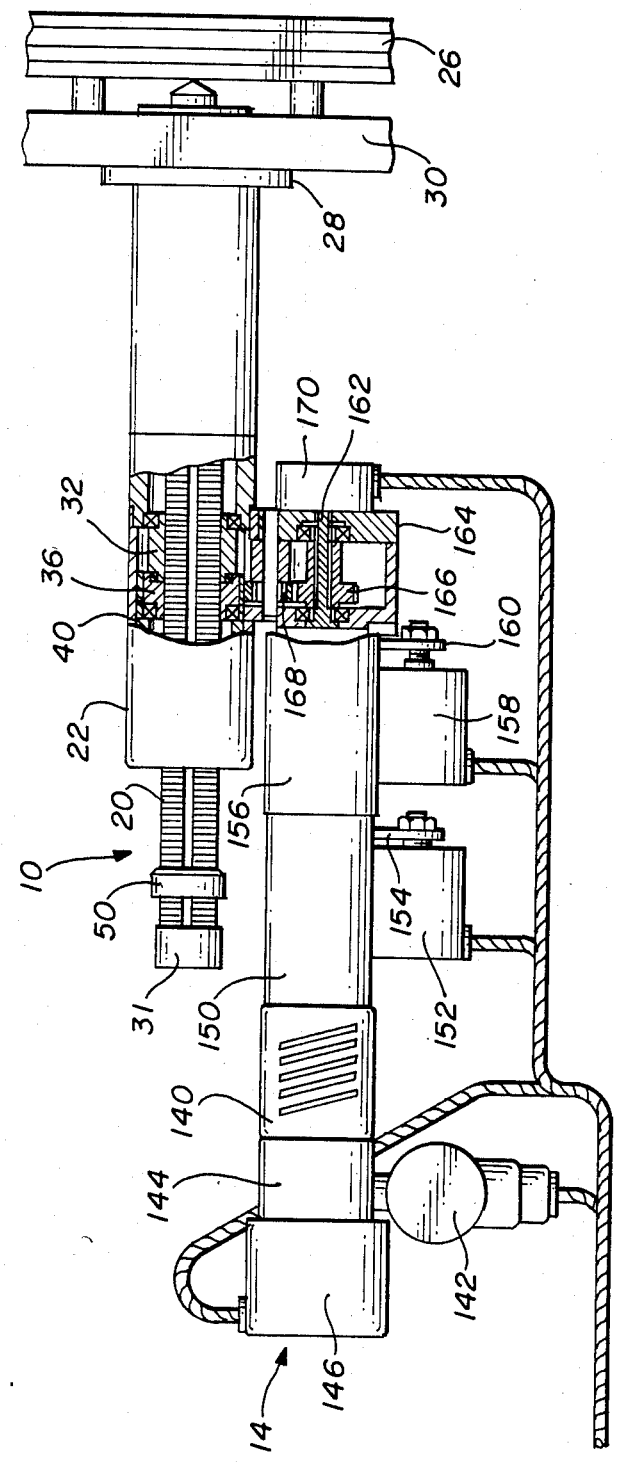
FIG. 3 is a pictorial elevation view of the spindle feed drive portion of the drill taken approximately on line 3—3 of FIG. 1 with portions of the figures shown in a cutaway section for clarity.

Referring to FIGS. 1, 2, and 3, collectively, positive feed power drill of this invention is shown therein mounted with a laminated construction workpiece. The power drill includes a spindle assembly 10 supporting a cutter and being mounted with the workpiece. A spindle rotation drive assembly indicated generally at 12 is mounted with spindle assembly 10 on one side thereof to provide rotating motion to the spindle.

A spindle feed drive assembly indicated generally at 14 is also mounted with spindle assembly 10 positioned adjacent thereto and operable to provide longitudinal feeding and retracting motion to the spindle. Both the spindle rotation drive assembly 12 and spindle feed drive 14 function cooperatively to control the speed of rotation and the speed and direction of motion of the tool spindle under coordination with and direction of the control system illustrated in the block diagram of FIG. 4.

Referring to FIGS. 1 and 2 with regard to the spindle assembly 10 such includes a threaded spindle member 20 longitudinally positioned through spindle housing 22 and having a cutter or drill bit 24 mounted with a lower end portion thereof for drilling a workpiece 26. Spindle housing 22 is mounted with a drill bushing 28 to a tooling plate 30 supported above workpiece 26. This construction supports the portable drill and a temporary drilling position above the workpiece.

Spindle member 20 is hollow and provided with a fluid coupling 31 on its upper end for the attachment of a cooling fluid flow line for liquid cooling of cutter 24. The threaded exterior of spindle 20 residus within the interior of spindle drive gear 32. Splines 34 within the interior of spindle drive gear 32 contact and reside within longitudinally disposed splines on the exterior of spindle member 20. Spindle feed gear 36 resides immediately above spindle drive gear 32 and is threadedly mounted with the exterior of spindle member 20 over left hand threads. The cooperative rotating motion of spindle drive gear 32 and spindle feed gear 36 function to displace spindle member 20 in the longitudinally direction. The rotation of spindle drive gear 32 rotates spindle member 20 within the interior of spindle feed gear 36.

The longitudinal thrust or forces incurred by cutter 24 are transferred through spindle feed gear 36 to an assembly for sensing thrust force on the spindle and the associated cutter. A spindle feed bearing 38 connects spindle feed gear 36 to a spindle thrust collar 40. A plurality of frusto-conically shaped spring washers form a spindle thrust spring assembly 42 within spindle thrust collar 40 around spindle member 20. Thrust collar 40 holds spring assembly 42 compressed to a preloaded value. Forces transferred from this spring assembly 42 to a second spring thrust collar 44 that abuts a spindle thrust load cell 46 interposed between second collar 44 and an upper end of spindle housing 22. Spindle thrust load cell 46 is a collar provided with strain gauges mounted thereon to sense longitudinal compression of the load cell collar due to longitudinal thrust forces exerted on spindle member 20. The strain gauges of load cell 46 are connected to the drill control system by an electrical cable as shown.

A thrust overload sensor is provided by a switch 48 mounted with spindle housing 22 having its contact member positioned in a spaced relation to the upper end of thrust collar 40. The construction of thrust collar 40 and thrust second collar 44 is such what when compressional forces on spring assembly 42 are increased beyond the preloaded value, thrust collar 40 is moved upward contacting overload sensor switch 48 indicating the presence of an overload or excessive thrust condition occurring on spindle 20. Overload sensor switch 48 is connected by an electrical cable to the control system.

The maximum feed limit of spindle 20 is governed by spindle feed limit stop ring 50 contacting a spindle feed limit stop sensor 52. The sensor includes a switch connected by an electrical cable to the control system. The spindle retract limit is governed by spindle retract limit stop ring 54 contacting spindle retract limit stop sensor 56 on the lower portion of spindle housing 22. This sensor contains a switch connected by an electrical cable to the control system. Limit stop rings 50 and 54 are threadedly and adjustably mounted on the threaded exterior of spindle member 20 to provide for adjustment in the longitudinal limits of motion of the spindle.

Referring to FIGS. 1 and 2 regarding the spindle rotating drive assembly indicated generally at 12 such as mounted on one side of spindle assembly 10 and connected with spindle housing 22. Spindle rotation drive assembly 12 includes a compressed air powered motor 60 mounted on an upper portion thereof. This motor 60 is a conventional rotary vane type compressed air motor connectable to a driving supply of compressed air through a solenoid actuated air inlet valve 62. Air inlet valve 62 is connected by an electrical cable to the control circuit. An air flow control valve assembly at the inlet to motor 60 includes a threadedly mounted control valve member 64 operably connected to an electrical stepping or servo motor 66. Control valve member 64 is operably connected to the output shaft of electrical stepping motor 66. Electrical stepping motor 66 is connected by an electrical cable to the control circuit and actuated to rotate the output shaft thereof and the connected associated valve member 64 in increments of a full rotation thereby providing a precise flow control on air supplied to the inlet of motor 60 thus accurately controlling the operating speed of this motor. Motor 60 has an output shaft 68 connected with the first of two series connected transmissions.

The transmissions are of the series connected planetary gear type shiftable between a speed reduction position and a directly connected position. Motor output shaft 68 has gear teeth formed around the periphery of a mid portion thereof forming the sun gear of the first planetary transmission 70. An idler gear 72 connects this sun gear of the motor output shaft 68 to the ring gear 74. A first transmission drive clutch 78 is mounted to the end of motor shaft 68 and provided with clutch dogs on the engaging side thereof. The transmission has a driven clutch member 82 on the output thereof slidably mounted on a splined portion of the first transmission output shaft segment 84. Driven clutch member 82 has a flange-like portion with clutch engaging dogs on both sides of the periphery thereof. Planet carrier member 76 extends in surrounding relation to the periphery of driven clutch member 82 and is provided with a plurality of clutch dogs 86 therearound in facing relation to the clutch dogs of driven clutch member 82. A first transmission shift member 88 is connected to driven clutch member 82 and operably connected to first transmission shift solenoid 90. With solenoid 90 energized as shown in FIG. 2 clutch dogs on the drive clutch member 78 are engaged with clutch dogs on driven clutch member 82 thereby connecting the motor output shaft 68 directly to the first transmission output shaft segment 84. With the solenoid de-energized shift member 88 moves to the right from the position shown in FIG. 2 to engage clutch dogs of driven clutch member 82 with clutch dogs 86 of planet gear carrier 76 thereby enabling the speed reducing function of the transmission. In this condition the rotation of first transmission output shaft segment 84 rotates at a slower speed than motor output shaft 68.

The second transmission, indicated generally at 94, is connected to the output of first transmission 70 with first transmission output shaft segment 84 forming the input shaft to this second transmission and having a shaft segment 96 with gear teeth therearound forming the sun gear portion of the planetary gear transmission. A second transmission planet gear 98 connects the sun gear portion 96 with an internally toothed ring gear 100. A drive clutch member 102 is mounted on the end of transmission shaft 84 and provided with clutch dogs on the exposed side thereof. The second transmission driven clutch member 106 is slidably mounted on second transmission output shaft 108 and displaced by a shift member 110. Driven clutch member 106 is provided with clutch dogs on both sides thereof. Planet carrier 112 has a carrier portion extending around driven clutch member 106 and provided with clutch dogs to engage the corresponding portions of driven clutch member 106. Second transmission 94 has a shifting solenoid 114 connected to shift member 110. With solenoid 114 in the de-energized position as shown in FIG. 2 the clutch dogs of driven clutch member 106 are engaged with the clutch dogs in planet carrier 112 to provide a speed reduction between the second transmission's input shaft 84 and its output shaft 108. When solenoid 114 is energized driven clutch member 106 is moved to a position similar to that shown in the first transmission with the clutch dogs of driven clutch member 106 engaged with corresponding portions of drive clutch member 102 directly connecting the second transmission's input and output shafts.

Surrounding output shaft 108 between second transmission 94 and the output of rotation drive assembly 12 is the apparatus to sense the torque applied to spindle 20. This segment of output shaft 108 includes a shaft segment 116 that is substantially square in its transverse cross section. Torque measuring strain gauges 118 are mounted to the four sides of this square shaft segment 116. The strain gauges are electrically connected to a plurality of slip rings 120 mounted around shaft segment 116. A plurality of slip ring brushes 122 are mounted within the housing to contact the slip ring and are connected by an electrical cable to the control circuit.

At the lower end portion of output shaft 108 is mounted within a bearing structure and includes a spindle pinion gear 126 mounted therearound. Spindle pinion gear 126 runs against an idler gear 128 in spindle housing 22. Idler gear 128 runs against spindle drive gear 32 to operably rotate spindle 20. At the lower end of output shaft 108 and operably connected thereto is a rotation encoding device 130 to sense and monitor the rotation of output shaft 116. This encoding device 130 may be an optical type, a mechanical type or an electrical sensing device that functions to sense rotary motion of the shaft. This encoding device is connected by an electrical cable to the control circuit.

With reference to FIG. 1 and FIG. 3 regarding the spindle feed drive assembly 14 such is shown in relationship to other elements of the tool and spindle assembly 10. Spindle feed drive assembly 14 is constructed similar to the upper portion of spindle rotation drive assembly 12 and includes a compressed air powered motor 140 having control air inlet valve 142 and an associated air flow control valve 144. A stepper or servo motor 146 is connected to control valve 144 to provide for air flow control to change the speed of motor 140 similar to that described above. A first transmission 150 is connected to the output of spindle drive assembly motor 140. First transmission 150 is provided with a shifting solenoid 152 and an associated shift member 154. The output of first transmission 150 is connected to an input of second transmission 156. Second transmission 156 is provided with a shift solenoid 158 and an associated shift member 160. Second transmission 156 has an output shaft 162 extending therefrom and mounted in the lower portion of housing 164. The transmissions 150 and 156 are the same construction as transmissions 70 and 94 described above thus will not be described in detail again. A spindle feed drive pinion gear 166 is mounted to second transmission output shaft 162 and runs with an idler gear 168. Spindle feed drive idler gear 168 runs against feed drive gear 36 in spindle assembly 10 to facilitate rotation of feed gear 36 and in turn longitudinal displacement of spindle 20.

At the lower portion of spindle feed drive assembly 14 a rotation encoder 170 is connected to second transmission output shaft 162 to sense and monitor the rotation thereof. This rotation encoder 170 is similar to encoder 130 described above and is connected by an electrical cable to the control circuit.

Figure 4:
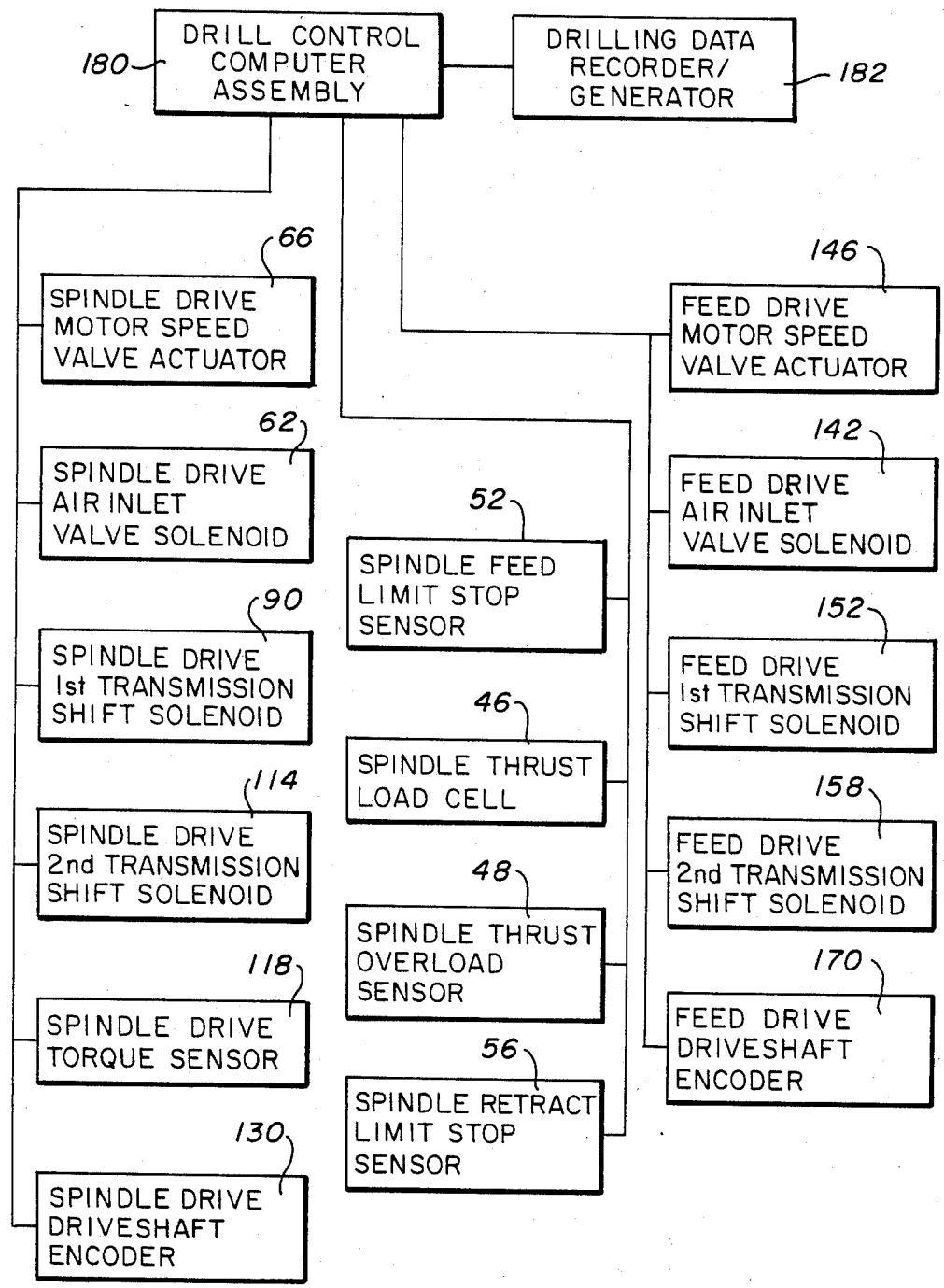
FIG. 4 is a block diagram of the power drill control system of this invention.

Referring now to FIG. 4 showing the control system circuit for the improved power drill of this invention such illustrates the control circuit in a block disgram form. A drill control computer assembly 180 is connected by electrical cables serving as control and data lines to the several control and sensor components of spindle assembly 10, spindle rotation drive assembly 12 and spindle feed drive 14 as illustrated by the three columns of appropriately identified components of the system. Drill control computer assembly 180 provides the necessary electrical interface between the several sensors, solenoids, and encoders used in the system and contains a programmed set of instructions for operation of the tool. The drilling data recorder 182 serves as a data input and output device from drill control computer assembly 180 as well as providing the ability to store records of drilling operations should such be necessary.

Drill control computer assembly 180 contains a special purpose computer that can be programmed to operate the drill of this invention in a manner prescribed for the drilling of holes in laminated layered material such as those containing layers of epoxy resin base material mixed with layers of metals such as titanium. A typical drilling sequence for the improved power drill of this invention is outlined below.

In the initial or start position for the drilling cycle both motors 60 and 140 are stopped and spindle 20 is in the retracted position with stop member 54 contacting spindle retract limit sensor 56. Spindle rotation drive assembly 12 has the transmissions thereof set for high speed operation with solenoids 90 and 114 both energized for direct connection of motor 60 to output shaft 116. In spindle feed drive assembly 14 transmissions 150 and 156 are also initially set for high speed operation.

When the drilling begins the drive assemblies are set to rapidly advance spindle 20 and associated cutter 24 to the workpiece from the fully retracted position. Rapid advance is achieved by operating feed drive assembly 14 alone with rotation drive assembly 12 being stopped. During this rapid advance spindle 20 is not rotated.

When cutter 24 contacts workpiece 26 the spindle thrust will increase as sensed by spindle thrust load cell 46. At this point in the drilling operation the cutter feed rate and rotation speed must be adjusted for drilling to begin.

Shifting of the transmissions can be done from the high speed mode to the low speed mode while the motors are operating. It is preferred that shifting does not occur in the reverse direction while the motors are operating. Thus, at this point in the drilling operation the appropriate solenoids could be shifted in the spindle rotation drive assembly and the spindle feed drive assembly to change the spindle feed rate and start rotation of the cutter. The specific cutter speed and feed rate used depends upon the specific material included in the workpiece. Nominally the drill's cutter can be rotated between 90 and 8,000 revolutions per minute (rpm) and the spindle can be fed into the workpiece at a rate between 0.0005 inches per revolution and 0.02 inches per revolution. Non-metallic materials such as graphite containing resins require a cutter rotation speed of between about 3,000 rpm to about 9,000 rpm and a cutter feed rate of between about 0.0005 and about 0.002 inches per revolution. Metals such as titanium require a cutter rotation speed of about 100 to 300 rpm and a cutter feed rate of between about 0.003 inches per revolution to about 0.0005 inches per revolution. Also, at this time in the drilling operation computer control assembly begins an accumulated total of the rotations of spindle rotation drive output shaft 108 by encoder 130 and the rotation of feed drive output shaft 162 by encoder 170 for use in determining the precise depth of the cutter as it further penetrates the workpiece. This depth determination is based on the known mathematical relationships of the gearing between the associated drive output shaft and the spindle as well as the thread pitch of the spindle, and the amount the feed gear has rotationally advanced or retracted with respect to the drive gear.

As drilling of the workpiece proceeds in some materials it is desirable to drill a predetermined distance then extract the cutter from the workpiece to remove the cutting chips. This can be done under control of drill control computer assembly. When cutter 24 reaches a predetermined depth spindle 20 can be moved in the retract direction to extract the tip of cutter 24 from the workpiece. Movement of spindle 20 in the retract direction is accomplished by rotating spindle drive gear 32 at a rate faster than spindle feed gear 36. To accomplish this the transmissions of spindle rotation drive assemblies can be shifted for high speed operation or by stopping rotation of feed gear 36.

Once cutter 24 is extracted from workpiece 26 sufficient for the cutting chips to fall away then direction of motion of spindle 20 can be stopped and reversed to resume the drilling operation. In doing this the several transmissions can be shifted to high speed operation for rapid advance of spindle 20 to the depth at which retraction of the spindle began. Rapid advance can be achieved by rotation of feed gear 36 while spindle rotation drive gear 34 is stopped. When cutter 24 reaches its predetermined depth drill control computer assembly 180 can then reset the drilling conditions of cutter to resume the drilling operation and continue drilling of the workpiece.

When cutter 24 passes through a non-metallic portion of workpiece 26 and contacts a metallic portion of the workpiece the thrust sensed by spindle thrust load cell 46 will increase providing a signal to drill control computer assembly 180 that cutter 24 has contacted a metallic layer of the workpiece. Based on this signal the speed functions of the drive assemblies can be readjusted for proper drilling of this metallic layer. At this time in the drilling location if desired the drive assemblies can be adjusted to retract the cutter a few thousandths of an inch then readjusted for the cutter speed and feed rate needed to drill the metallic layer. The inclusion of this step in the drilling process is optional at the desire of the drill system operator. Also, similar reverse feed and readjustment steps can be used when penetrating any layer of material or at any change of cutter speed or feed rate. Because of the separate transmissions included in each drive assembly and the variable motor speed available because of the air flow control to the drive motors the cutter speed can be precisely and accurately controlled in order to optimize the cutter speeds for drilling.

Normal drilling of the metallic layer continues to until the end of cutter 24 breaks through the metallic layer into the layer below. We shall assume for purposes of this discussion this next layer to be non-metallic, thus softer and creating a decrease in the thrust sensed by spindle feed load cell 46. With this signal indication the operating speed of spindle rotation drive assembly 12 and feed drive assembly 14 can again be readjusted for optimum drilling of the next layer of workpiece 26 in accordance with a programmed set of instructions.

At the point in the drilling operation when cutter 24 breaks through the backside of workpiece 26 thrust sensed by spindle thrust load cell 46 will decrease significantly thereby providing an indication of breakthrough. Also, the accumulated depth record retained by drill control computer assembly 180 can be used as an indication that forward advancement of spindle 20 should be ceased. At this point the drilling operation of the spindle feed drive assemblies are again reset to provide for a retraction of cutter 24 from the workpiece.

In the event of cutter breakage or some other unexpected event the spindle drive load cell 46 and/or the spindle rotation drive assembly torque sensor are used by drill control computer assembly 180 to sense an abnormal condition. Normal operating limits for the inputs from these sensors can be utilized as threshold limits for the drill control in sensing abnormal conditions. In the event of an abnormal condition operation of the drill can be halted and the operator notified of the presence of an abnormal condition so that he might inspect the drill and the workpiece to determine the nature of the abnormality and take appropriate action by manual control of the drill or other appropriate action.

Because the power drill of this invention is portable it can be moved and remounted with a workpiece at several different locations or moved between various workpieces. When this occurs reprogramming of drill control computer assembly 180 is done by using drilling data recorder 182 to enter prerecorded programmed commands or to generate new drilling control commands.

Although specific preferred embodiments of this invention have been described in detail in the preceding description this description is not intended to limit the invention to the particular form or embodiments disclosed herein since they are to be recognized as illustrative of the invention rather restrictive and it would be obvious to those skilled in the art that the invention is not so limited.

This invention is declared to cover all changes and modifications of the specific example of the invention herein disclosed for purposes of illustration which does not constitute departures from the spirit and scope of the invention.

In the embodiments of the invention in which an exclusive property or privilege is claimed are defined as follows:

1. A power drill and control therefore comprising:
   (a) a drill spindle means including a spindle member for mounting a rotary cutter on said drill spindle means;
   (b) a spindle rotation drive means including a compressed air powered drive motor having a rotatable output shaft and an associated rotation drive mechanism operably connected between said motor shaft and said spindle means to rotate said spindle member;
   (c) a spindle feed drive means including a compressed air powered feed motor having a rotatable output shaft and an associated feed drive mechanism operably connected between said motor shaft and said spindle means to convert rotational movement in said drive means to reciprocal movement and to feed said spindle member in a forward direction toward a workpiece and in a retract direction away from a workpiece;
   (d) means to stop and start said drive motor and said feed motor independently;
   (e) means with said spindle rotation drive means to vary the rotational speed of said spindle member;
   (f) means with said spindle feed drive means to vary the rate of feed of said spindle member;
   (g) means with said spindle rotation drive means to sense the operational torque of said spindle member;
   (h) means with said spindle drive means to sense thrust force on said spindle member and on an associated cutter;
   (i) means with said spindle rotation drive means to sense and monitor the spindle drive rotation;
   (j) means with said spindle feed drive means to sense and monitor the feed drive rotation; and
   (k) control means operably connected with said above plurality of means to control the rotational speed of said spindle means, the rate of feeding motion of said spindle means, and the displacement of said spindle member to place an associated cutter at a predetermined depth and additionally to control removing of the associated cutter from the workpiece upon completion of the drilling operation.

2. The drill and control of claim 1, additionally including; means with said control means and with said means to sense and monitor spindle drive rotation and with said means to sense and monitor spindle feed drive rotation to determine the position of an associated cutter and the direction of motion thereof.

3. The power drill and control means of claim 2, additionally including; means with said control means to move said spindle member and an associated cutter in a predetermined sequence of operations to drill an aperture in a composite workpiece requiring a plurality of different cutter rotational speeds and different rates of cutter penetration.

4. The power drill and control means of claim 3, additionally including means with said spindle feed drive means to limit the maximum spindle member travel.

5. The power drill and control means of claim 3, additionally including means with said spindle feed drive means to sense a thrust overload and to at least temporarily halt feeding of said spindle member toward a workpiece.

6. The power drill and control means of claim 3, additionally including means with said spindle rotation drive means to sense the torque thereof being above a predetermined overload value and having means associated with said control means operable to halt motion of said spindle upon the occurrence of an overload torque condition.

7. The power drill and control means of claim 3, wherein:
   said means to move said spindle member with a cutter attached thereto includes means to feed said spindle and an attached cutter to the workpiece for drilling a predetermined distance and retracting said spindle member and cutter from said workpiece for removal of cuttings and again feeding said spindle member and cutter toward the workpiece in a repetitive cyclic operation.

8. The power drill and control means of claim 1, wherein said means to control the rotational speed of said spindle member and said means to control the rate of feed of said spindle member each respectively include an air flow valve operable to control the flow of driving compressed air to the respective air powered motors of said rotation drive and said feed drive means.

9. The power drill and control means of claim 8, wherein said means to control the rotational speed of said spindle member includes a transmission means operably connected between said spindle drive means motor and said spindle means; and said means to vary the rate of feed of said spindle includes a transmission means interposed between said spindle feed drive means motor and said spindle means.

10. The power drill and control means of claim 9, wherein:
    said transmission means interposed between said spindle rotation drive means motor and said spindle means includes a pair of series connected two speed transmissions; and said transmission means interposed between said spindle feed drive means motor and said spindle means includes a pair of series connected two speed transmissions.

11. The power drill and control means of claim 9, wherein said means to sense the operational torque of said spindle includes a shaft segment interposed between said transmission means and said spindle having a torque measuring strain gauge means attached thereto operable to measure torque transmitted through said shaft segment.

12. The power drill and control means of claim 9, wherein said means to sense and monitor spindle drive rotation and said means to sense and monitor feed drive rotation includes an optical rotation sensor and encoder means operably connected to the output of said respective transmission means operable to sense and encode the rotations to the associated respective drive means.

13. The power drill and control means of claim 9, wherein said means to stop and start said rotation drive motor and said feed motor includes means with said spindle to limit spindle movement between a retracted position and a fully extended position.

14. The power drill and control means of claim 8, wherein said control means includes a means with said spindle means to sense excessive thrust encountered by said spindle member when moving toward the extended position, said means to sense excessive thrust additionally including means therewith to stop advancement of said spindle member and retract same upon encountering said excessive thrust condition.

15. The power drill and control means of claim 1 further comprising transmission means interposed between said spindle rotation drive motor and said spindle means comprising a plurality of series connected multi-speed transmissions.

16. The power drill and control means of claim 15 further comprising transmission means between said spindle feed motor and said spindle means comprising a plurality of series connected multi-speed transmissions.

17. The power drill and control means of claim 1 wherein said means to sense the rotational torque of said spindle comprises torque measuring strain gauge means attached to a shaft segment interposed between said air powered drive motor and said spindle member and operable to measure torque transmitted through said shaft segment.

* * * * *